US010224836B2

(12) United States Patent
Bachman

(10) Patent No.: US 10,224,836 B2
(45) Date of Patent: Mar. 5, 2019

(54) MULTIPLE SUPPLY VOLTAGE MOTOR ASSEMBLY

(71) Applicant: Halliburton Energy Services, Inc., Houston, TX (US)

(72) Inventor: Troy Dale Bachman, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 9 days.

(21) Appl. No.: 15/022,762

(22) PCT Filed: Sep. 18, 2015

(86) PCT No.: PCT/US2015/050942
§ 371 (c)(1),
(2) Date: Mar. 17, 2016

(87) PCT Pub. No.: WO2017/048279
PCT Pub. Date: Mar. 23, 2017

(65) Prior Publication Data
US 2017/0264217 A1  Sep. 14, 2017

(51) Int. Cl.
H02P 1/32 (2006.01)
H02K 3/28 (2006.01)
(Continued)

(52) U.S. Cl.
CPC ............... *H02P 1/32* (2013.01); *H02K 3/28* (2013.01); *H02M 1/084* (2013.01); *H02P 1/028* (2013.01);
(Continued)

(58) Field of Classification Search
CPC ............... H02P 1/32; H02P 21/18; H02P 6/16
See application file for complete search history.

(56) References Cited

U.S. PATENT DOCUMENTS 6,108,226 A   8/2000  Ghosh et al.
6,208,120 B1  3/2001  Gibbs
(Continued)

FOREIGN PATENT DOCUMENTS

CN   101222192 A   7/2008
CN   102957375 A   3/2013
(Continued)

OTHER PUBLICATIONS

"ACSEW243008X-203 75KW Comb. Soft Starter, 380-690V", Drawing No. HS121017-01, (Sep. 24, 2012), 2 pgs.
(Continued)

Primary Examiner — Bickey Dhakal
Assistant Examiner — Charles S Laughlin
(74) Attorney, Agent, or Firm — Chamberlain Hrdlicka

(57) ABSTRACT

Various embodiments include determining an alternating current (AC) voltage and frequency of a supply voltage coupled to a circuit input. The circuit includes a soft starter circuit that is coupled between the circuit input and a first side of an AC motor. A stator winding configuration of the AC motor is determined. A control transformer is configured in response to the AC voltage and frequency, wherein the control transformer is coupled to the circuit input. A jumper device is configured on a second side of the AC motor in response to the stator winding configuration of the AC motor.

15 Claims, 7 Drawing Sheets

(51) Int. Cl.
    *H02P 25/18*     (2006.01)
    *H02P 27/16*     (2006.01)
    *H02P 1/24*     (2006.01)
    *H02M 1/084*     (2006.01)
    *H02P 1/02*     (2006.01)
    *H02H 7/06*     (2006.01)
    *H02P 6/14*     (2016.01)
    *H02P 6/26*     (2016.01)
    *H02H 3/08*     (2006.01)

(52) U.S. Cl.
    CPC .............. *H02P 1/24* (2013.01); *H02P 25/184* (2013.01); *H02P 27/16* (2013.01); *H02H 3/08* (2013.01); *H02H 7/06* (2013.01)

(56) References Cited

U.S. PATENT DOCUMENTS

| | | | |
|---|---|---|---|
| 6,380,708 B1 | 4/2002 | Gritter | |
| 6,784,643 B2 | 8/2004 | Hayashi et al. | |
| 6,850,426 B2 | 2/2005 | Kojori et al. | |
| 7,378,821 B2* | 5/2008 | Simpson, III | H02J 3/1892 323/205 |
| 7,928,685 B2 | 4/2011 | Dornauer et al. | |
| 8,598,836 B1* | 12/2013 | Rabinovich | H02P 1/28 318/771 |
| 8,619,443 B2 | 12/2013 | Lumsden | |
| 8,692,398 B2 | 4/2014 | Neddermeyer, III et al. | |
| 2010/0068987 A1* | 3/2010 | Lin | F04D 25/068 454/341 |
| 2011/0006720 A1* | 1/2011 | Naiman | H02P 1/26 318/771 |

FOREIGN PATENT DOCUMENTS

| | | |
|---|---|---|
| CN | 101404472 B | 7/2013 |
| JP | 04327887 A | 11/1992 |
| JP | 07322660 A | 12/1995 |
| JP | 2002272180 A | 9/2002 |

OTHER PUBLICATIONS

"Instructions for Installation, Operation and Maintenance of the Ampgard IT Softstart Motor", Instruction Bulletin, EPODAMA002, © 2004 Eaton Cutler Hammer, (Nov. 2004), 26 pgs.
"International Application Serial No. PCT/US2015/050942, International Search Report dated Feb. 26, 2016", 3 pgs.
"International Application Serial No. PCT/US2015/050942, Written Opinion dated Feb. 26, 2016", 6 pgs.

* cited by examiner

US 10,224,836 B2

MULTIPLE SUPPLY VOLTAGE MOTOR ASSEMBLY

PRIORITY APPLICATIONS

This application is a U.S. National Stage Filing under 35 U.S.C. 371 from International Application No. PCT/US2015/050942, filed on 18 Sep. 2015, which application is incorporated herein by reference in its entirety.

BACKGROUND

Electric motors and their associated starters are typically designed into a power package that is rated for the voltages and frequencies that are in use in a particular country or region. For example, common U.S. line voltages include 230V/60 HZ, 460V/60 Hz, or 690V/60 HZ while common European line voltages include 230V/50 Hz, 400V/50 HZ or 660V/50 Hz.

Multiple versions of the power package are typically built in order to field equipment at a plurality of international locations in order to accommodate the various voltages and frequencies. Thus, additional engineering, maintenance, and deployment costs are incurred in order to build equipment that may otherwise be identical in all ways except for the power package installed on the unit. This may be especially problematic in the offshore petroleum industry where market conditions dictate that service equipment be built well before the end destination is known. Motor equipment may also be moved or redirected from one international location to another due to unexpected changes in market conditions where the AC service voltages available at the new location are incompatible with the equipment built for the previous location.

DETAILED DESCRIPTION

Some of the challenges noted above, as well as others, can be addressed by a multiple AC supply voltage motor apparatus and system. The apparatus includes the capability of providing an AC motor power package that is usable in a wide range of voltage ratings. The wide range of voltages is achieved by configuring, in response to the supply voltage, jumpers in a control transformer coupled to an input node and a jumper cable between the motor and the input node.

Figure 1:
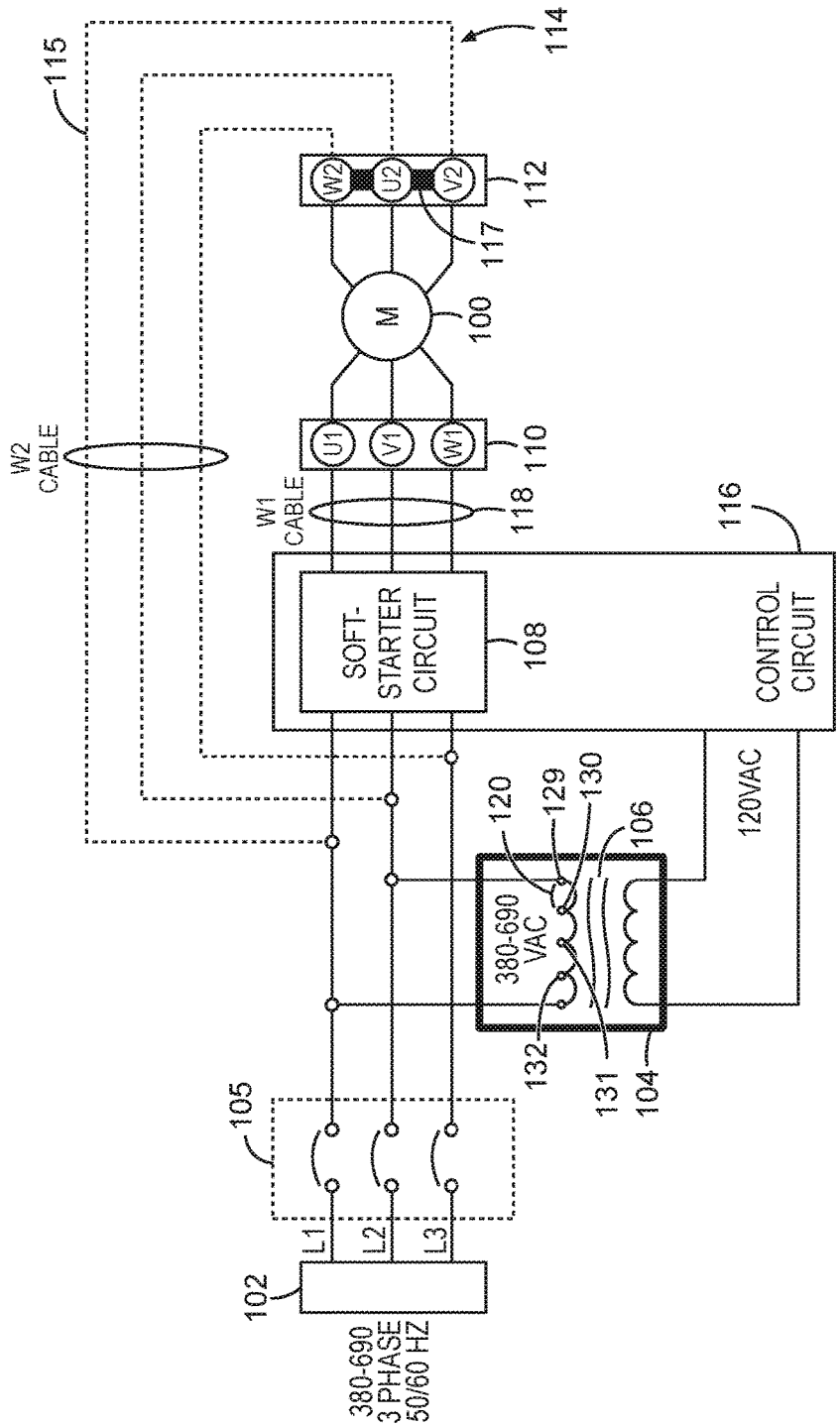
FIG. 1 is a block diagram showing a multiple supply voltage apparatus and system for an alternating current (AC) motor, according to various embodiments of the disclosure.

FIG. 1 is a block diagram showing a multiple supply voltage apparatus and system for an alternating current (AC) motor 100, according to various embodiments of the disclosure. While the following description discusses a voltage range of 380-690 VAC at either 50 or 60 Hertz (Hz), the supply voltages are not limited to any certain voltages or frequencies.

The apparatus includes an input node 102 that is to be coupled to a supply voltage (e.g., 380-690 VAC, 50/60 Hz). A circuit breaker device 105 (including contact switch) may be coupled between a soft starter circuit 108 and the input node 102.

Figure 3:
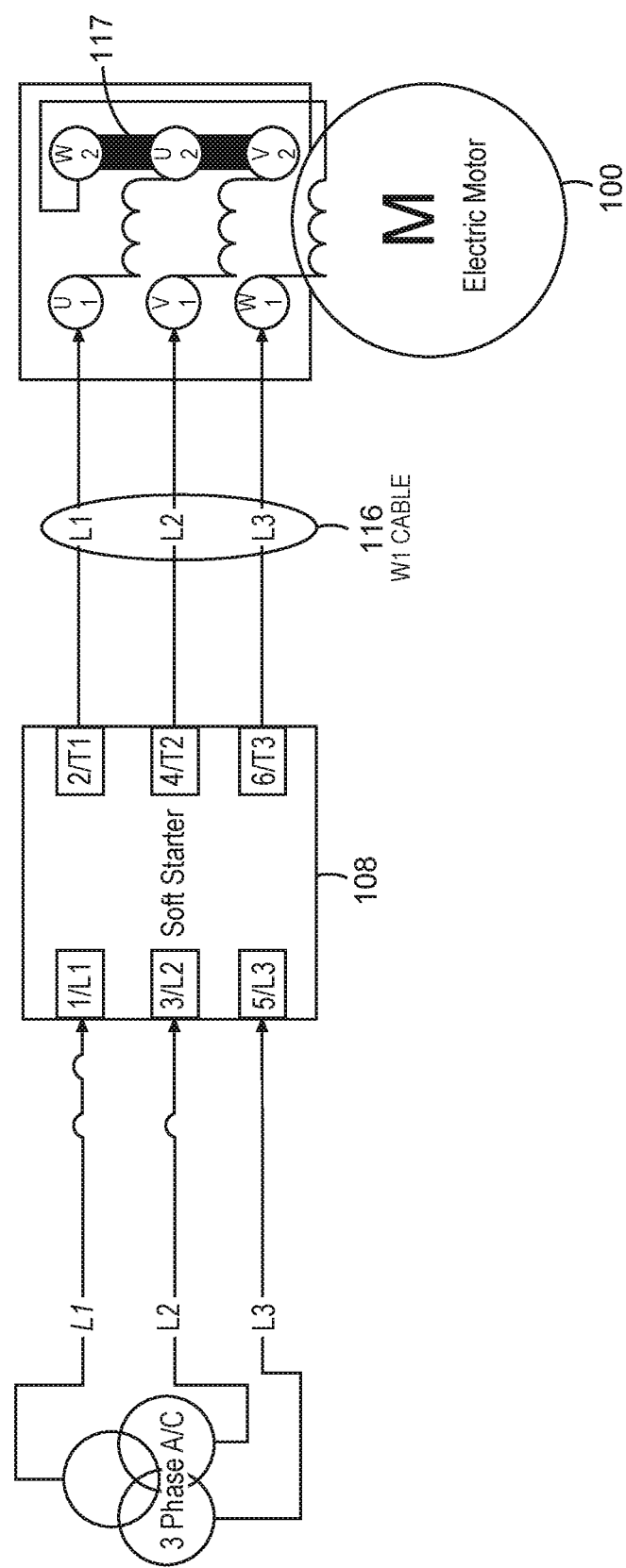
FIG. 3 is a schematic diagram showing another realization of the embodiment of FIG. 1 incorporating an AC motor having an in-line Wye configuration, according to various embodiments of the disclosure.

The soft starter circuit 108 is coupled between the input node 102 and a first AC motor node 110. The soft starter circuit 108 is coupled to the first AC motor node 110 over a cable 118. One embodiment of a soft starter circuit 108 is illustrated in FIG. 3 and discussed subsequently.

A configurable AC motor jumper device 114 is coupled to a second AC motor node 112. The configurable AC motor jumper device 114 may include a cable 115 that connects the second AC motor node 112 to the input node 102 when the AC motor 100 has a delta configuration. The configurable AC motor jumper device 114 may alternatively include a set of jumpers 117 that short together connections of the second. AC motor node 112 when the AC motor 100 has a Wye configuration.

An input transformer 106 has a first coil connected to at least two of the phase input lines. In the illustrated embodiment, the first coil of the input transformer 106 is connected to the L1 phase line and the L2 phase line. Other embodiments may connect the transformer 106 to different phase lines.

A second coil of the control transformer 106 is coupled to a control circuit 116. For example, the control circuit 116, powered by the 120 VAC output of the control transformer 106, may include motor control related circuits (e.g., relays, enclosure heaters, thermostats) as well as the soft-starter circuit 108.

A configurable input jumper device 104 includes an electrical conductor (i.e., jumper) 120 that may be used to connect a connect point 129 of the first coil to a jumper point 130-132 of the first coil. The jumper 120 of the configurable input jumper device 104 may be connected between the connect point 129 and one of the jumper points 130-132 in order to provide a voltage (e.g., 380 VAC, 460 VAC, 600 VAC, 690 VAC) on the first coil of the control transformer 106 such that the transformer 106 provides 120 VAC on the second coil. This provides 120 VAC to the control circuit 116. While only three jumper points 130-132 are shown, other embodiments may have different numbers of jumper points 130-132 in order to provide different voltages on the first coil.

A system includes the above described apparatus coupled to an AC motor 100. The AC motor 100 includes one side of its windings coupled to the first AC motor node 110 and a second side of the windings coupled to the second AC motor node 112. The AC motor 100 may be manufactured to have one of a plurality stator winding configurations. For example, the stator winding configurations may include inside delta, for lower voltage embodiments (e.g., less than or equal to approximately 480 VAC), and in-line Wye configurations, for higher voltage embodiments (e.g., greater than approximately 480 VAC).

An AC motor wired at a lower voltage in-line delta configuration will draw more current than when wired in a higher voltage in-line Wye wired configuration. Therefore, delta wired motors typically use more expensive cabling and higher current rated soft starters than if the same motor was wired in the in-line Wye configuration.

The multiple supply voltage apparatus and system for the alternating current (AC) motor 100 uses inside delta wiring instead of in-line delta wiring. This allows the motor 100 running at the lower voltage range to use the same size soft starter and cabling as when the motor is configured in the in-line Wye configuration. By using this technique, the apparatus and system may operate at a lower rated voltage or higher rated voltage without the need to use heavier wiring conductors. The only modification is to move from inside delta wiring to in-line Wye wiring by: a) removing the jumper cable W2 115; b) shorting the AC motor windings with a jumper 117; and c) reconfiguring the control transformer 106 for the higher voltage range. This eliminates the need to replace the entire power package with a new power package rated for the targeted service voltage.

Figure 2:
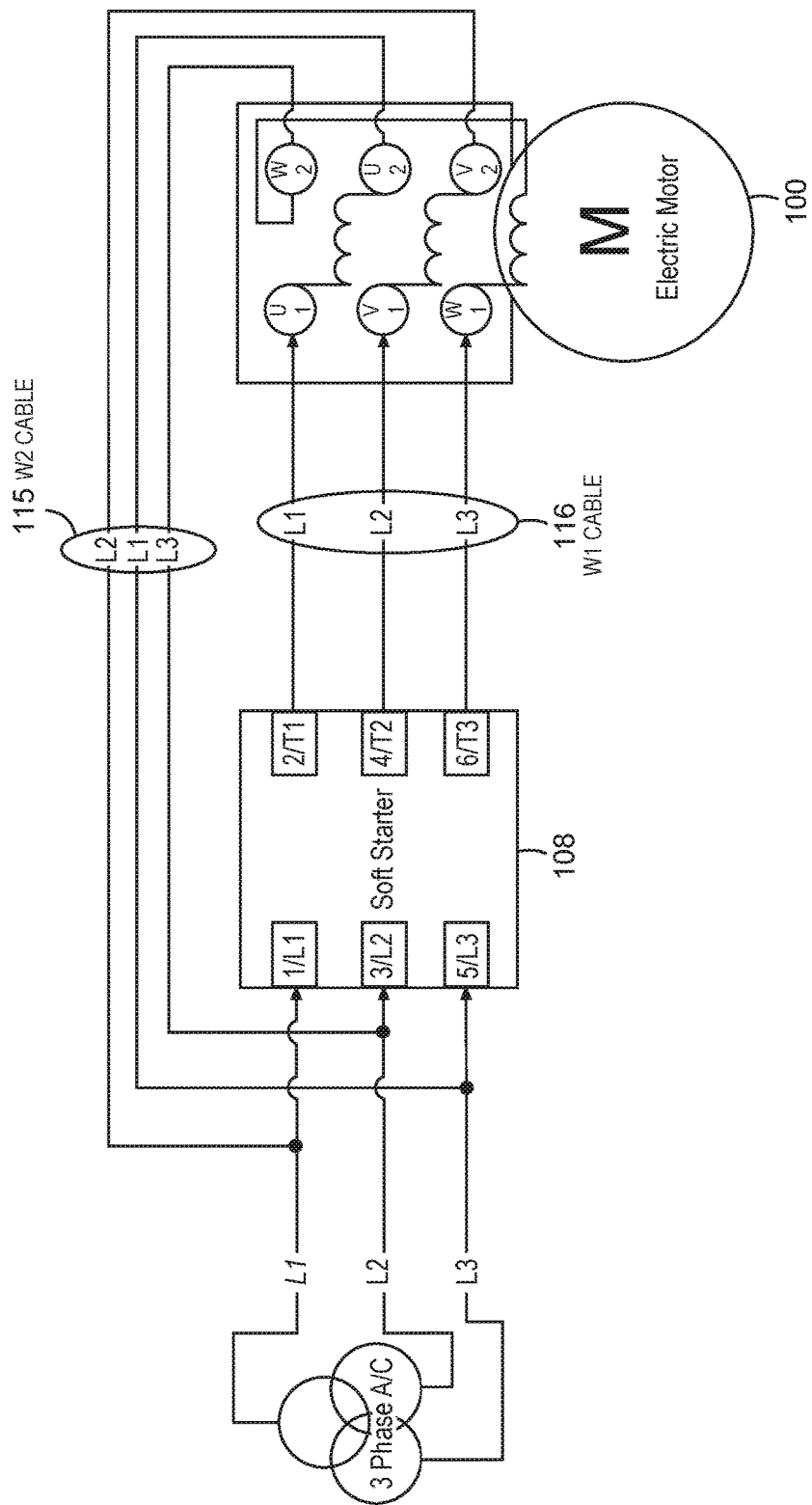
FIG. 2 is a schematic diagram showing one realization of the embodiment of FIG. 1 incorporating an AC motor having an inside delta configuration, according to various embodiments of the disclosure.

FIG. 2 is a schematic diagram showing one realization of the embodiment of FIG. 1 incorporating an AC motor 100 having an inside delta configuration, according to various embodiments of the disclosure.

In order to utilize the same size power cable for multiple supply voltages to both Wye and delta wired motor configurations, the soft starter circuit 108 is connected inside the delta of the motor windings. This is typically referred to as inside delta wiring and uses six conductors rather than the more common in-line set of three conductors. This technique reduces the current between the soft starter 108 and the AC electric motor 100 from line current levels to phase current levels. The jumper cable W2 115 is connected between the second AC motor node 112 and the input node 102 (see FIG. 1). Jumper connections 117 are not used at the second AC motor node 112 in an inside delta configuration.

FIG. 3 is a schematic diagram showing another realization of the embodiment of FIG. 1 incorporating an AC motor 100 having an in-line Wye configuration, according to various embodiments of the disclosure.

This is the common Wye wiring method that incorporates three conductors to the motor. Jumper connections 117 are connected at the second AC motor node 112 to short the motor windings into a Wye configuration. The jumper cable 115 used for the inside delta configuration is removed or omitted in situations where the motor 100 has an in-line Wye configuration.

Figure 4:
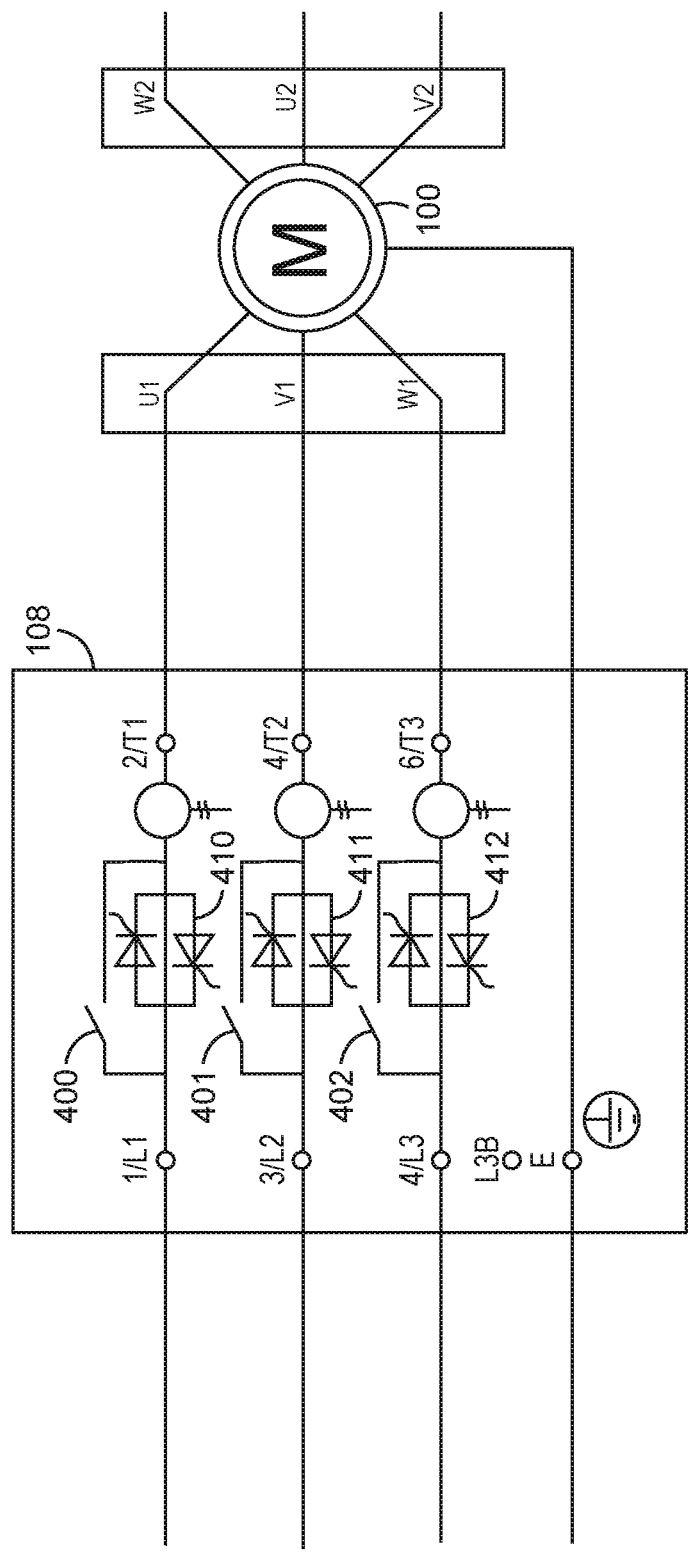
FIG. 4 is a schematic diagram showing one realization of a soft starter circuit, according to various embodiments of the disclosure.

FIG. 4 is a schematic diagram showing one realization of a soft starter circuit 108 of the embodiment of FIG. 1, according to various embodiments of the disclosure. The soft starter circuit 108 of FIG. 4 is for purposes of illustration only. Other embodiments may use other types of soft starter circuits.

A motor soft starter 108 is a device used with AC electrical motors to temporarily reduce the load and torque in the power train and electric current surge of the motor during start-up. This reduces the mechanical stress on the motor and shaft, as well as the electrodynamic stresses on the attached power cables and electrical distribution network, thereby extending the lifespan of the system.

The soft starter circuit 108 may include mechanical or electrical devices, or a combination of both. Mechanical soft starters include clutches and several types of couplings using a fluid, magnetic forces, or steel shot to transmit torque, similar to other forms of torque limiter. Electrical soft starters can be any control system that reduces the torque by temporarily reducing the voltage or current input, or a device that temporarily alters how the motor is connected in the electric circuit.

The illustrated soft starter circuit 108 includes a plurality of reverse-parallel connected silicon-controlled rectifiers (SCR) 410-412. Each SCR 410-412 includes a bypass switch 400-402 that is open when the respective SCR 410 is used and closed when the respective SCR 410-412 is bypassed. Each of the SCR 410-412 and respective switch 400-402 combinations provides control over each phase line from the supply voltage to the motor 100.

The soft starter circuit 108 may be programmable with various AC motor parameters. The AC motor parameters may include: a current limit for the AC motor, an initial current for the AC motor, and a starter ramp time for the AC motor.

Figure 5:
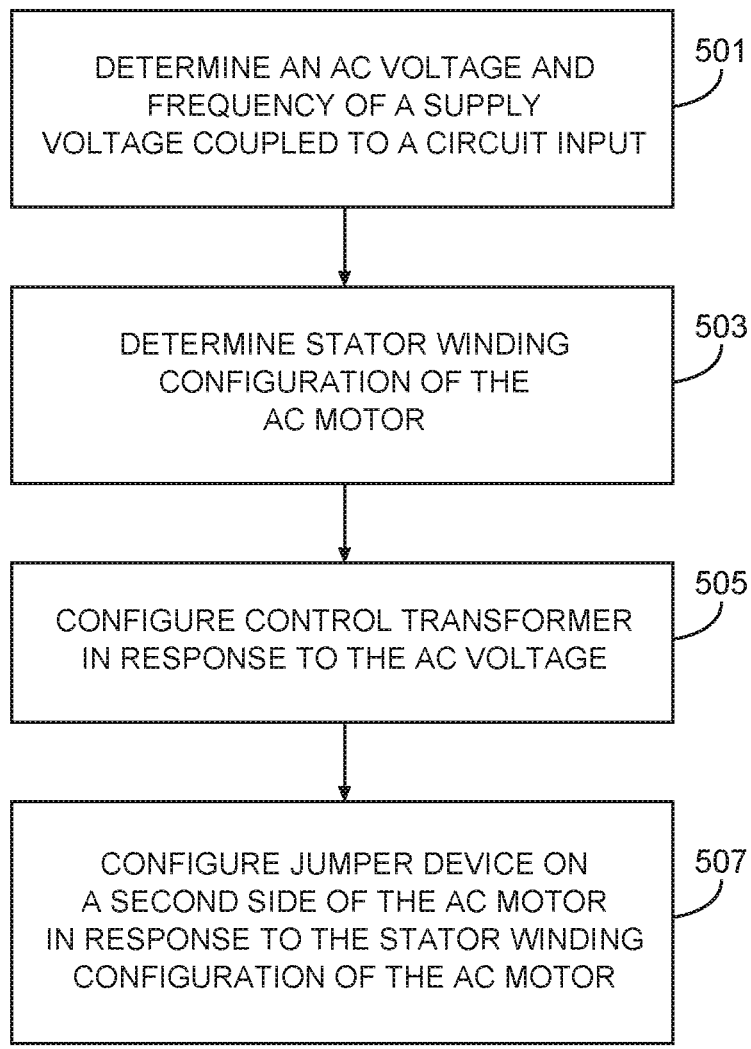
FIG. 5 is a flowchart showing a method for operation of a multiple supply voltage motor apparatus and system, according to various examples of the disclosure.

FIG. 5 is a flowchart showing a method for operation of the multiple input voltage motor apparatus and system, according to various examples of the disclosure. In block 501, the method includes determining an alternating current (AC) voltage and frequency of a supply voltage coupled to a circuit input. The voltage may be in a range of 380-690 VAC or some other range. The frequency may be 50 Hz, 60 Hz, or some other frequency.

In block 503, a stator winding configuration of the AC motor is determined. In block 505, a control transformer is configured in response to the AC voltage. In block 507, a jumper device (e.g., jumper cable W2 115 or shorting jumpers 117) is configured on a second side of the AC motor in response to the stator winding configuration of the AC motor.

The method may further include programming the soft starter circuit in response to the AC motor operational parameters. The AC motor parameters include: a current limit for the AC motor, an initial current for the AC motor, a starter ramp time for the AC motor, as well as other parameters.

Figure 6:
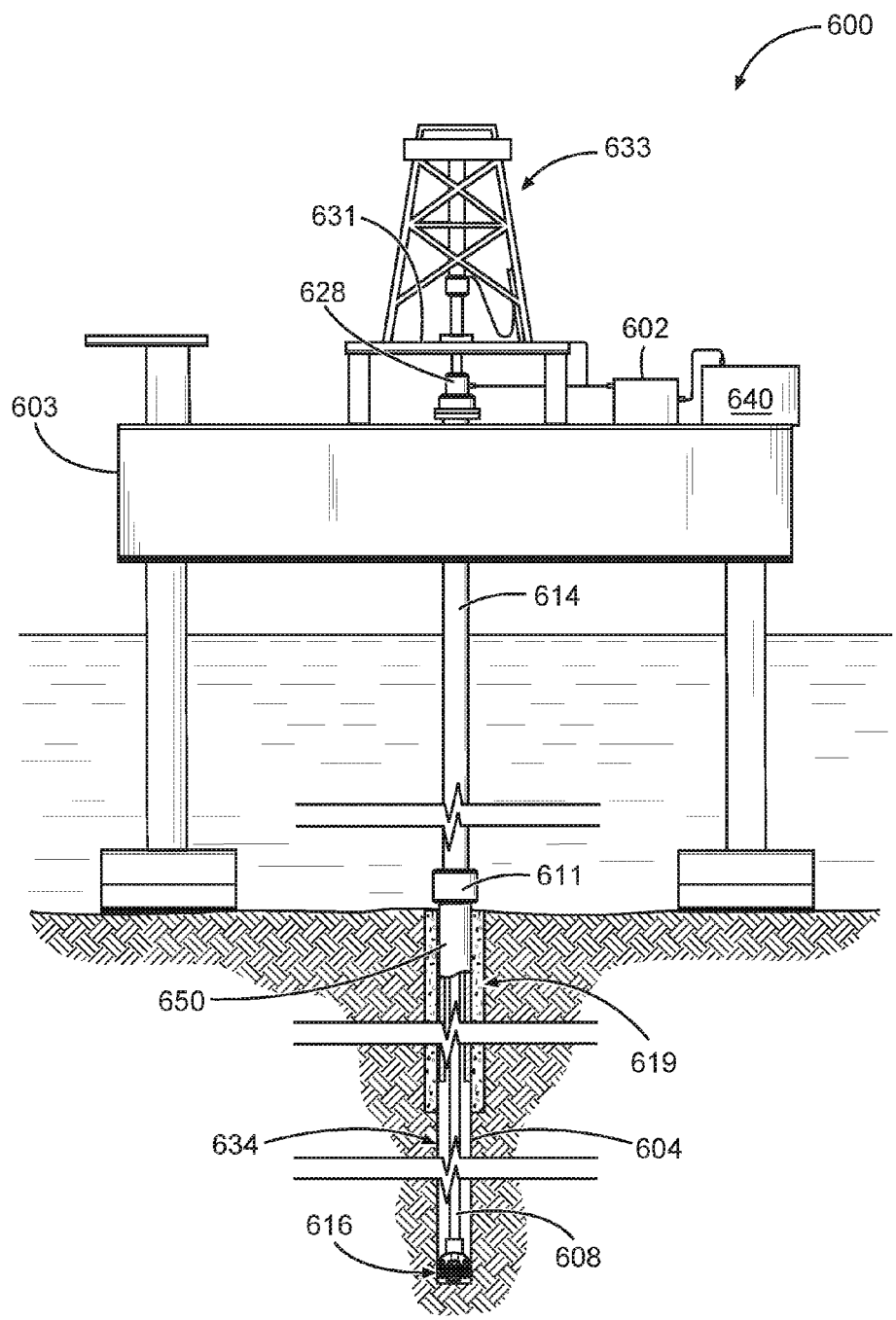
FIG. 6 is a diagram of a drilling system that includes a skid with the multiple supply voltage motor apparatus and system, according to various examples of the disclosure.

FIG. 6 is a diagram of a drilling system comprising a drilling installation 600 in the example form of an offshore rig that includes a skid 602 that may include the multiple supply voltage AC motor apparatus and system as described previously. The drilling system 600 comprises a drilling installation that includes an offshore floating semi-submersible drill rig 603 which is used to drill a subsea borehole 604 by means of a drill string 608 suspended from and driven by the drill rig 603. In other embodiments, the disclosed method, apparatus, and system may be used in different drill rig configurations, including both offshore and land drilling.

The drill string 608 comprises sections of drill pipe suspended from a drilling platform 633 on the drill rig 603. A downhole assembly or bottom hole assembly (BHA) at a bottom end of the drill string 608 includes a drill bit 616 which is driven at least in part by the drill string 608 to drill into Earth formations, thereby piloting the borehole 604. Part of the borehole 604 may provide a wellbore 619 that comprises a casing hung from a wellhead 611 on the seafloor. A marine riser 614 extends from the wellhead 611 to the drill rig 603. A rotating control device (RCD) 628 is positioned below a rig floor 631 provided by the drilling platform 633. The drill string 608 thus extends from the rig floor 631, through the RCD 628, the riser 614, the wellhead 611, the wellbore casing, and along the borehole 604.

After removal of the drill string 608, the motors of a pump system deliver pressurized cement slurry from a container 640 on the drill rig 603 to a supply line connected to an interior conduit of the drilling platform 633. The cement is forced downhole through the casing 650 in the wellbore 619 and up through the annulus between the casing 650 and the wellbore 619.

Figure 7:
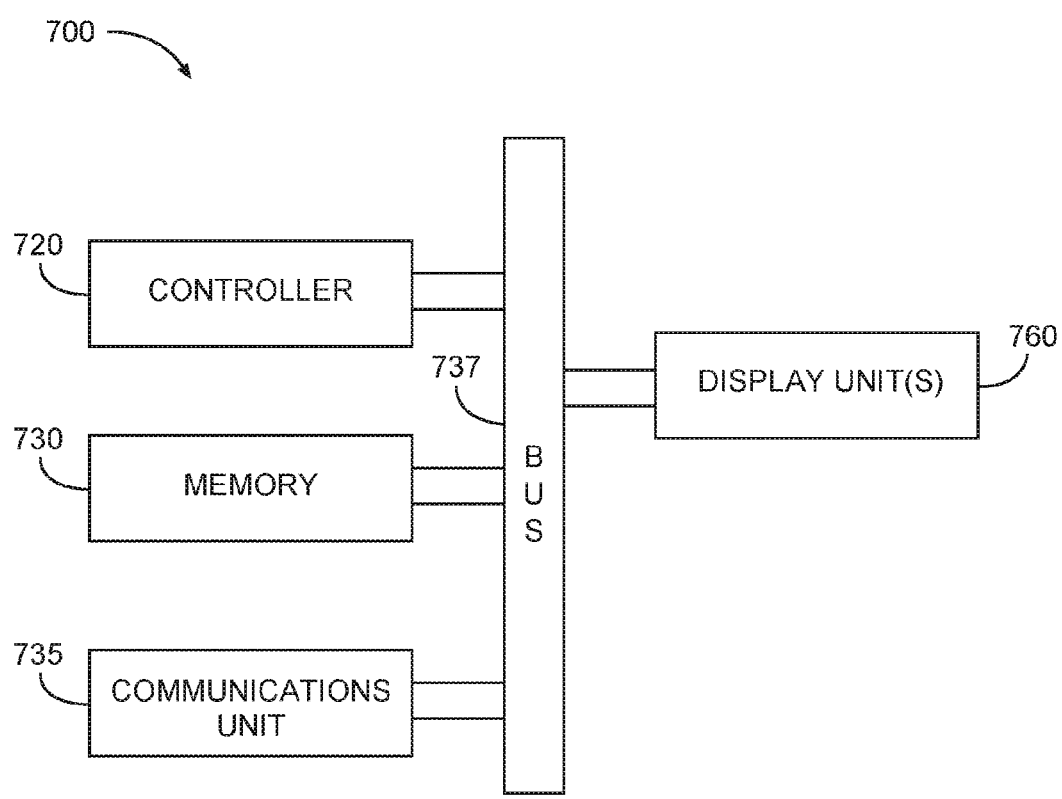
FIG. 7 is a block diagram of an example controller system operable to implement the activities of multiple methods, according to various examples of the disclosure.

FIG. 7 is a block diagram of an example system 700 operable to implement the activities of multiple methods, according to various examples of the disclosure. The system 700 may include circuitry such as a controller 720, a memory 730, and a communications unit 735. The memory 730 may be structured to include a database. The controller 720, the memory 730, and the communications unit 735 may be arranged to operate as control circuitry to control operation of apparatus and systems and execute any methods disclosed herein in order to control one or more motors.

The communications unit 735 may include communications capability for various protocols. Such communications capability may include wired communication technologies and wireless technologies.

The system 700 may also include a bus 737 that provides electrical conductivity among the components of the system 700. The bus 737 can include an address bus, a data bus, and a control bus, each independently configured or in an integrated format. The bus 737 may be realized using a number of different communication mediums that allows for the distribution of components of the system 700. The bus 737 may include a network. Use of the bus 737 may be regulated by the controller 720.

The system 700 may include display unit(s) 760 as a distributed component on the surface of a wellbore, which may be used with instructions stored in the memory 730 to implement a user interface to monitor/control the operation of the apparatus and system. Such a user interface may be operated in conjunction with the communications unit 735 and the bus 737.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Example 1 is a method comprising: determining an alternating current (AC) voltage and frequency of a supply voltage coupled to a circuit input, the circuit comprising a soft starter circuit coupled between the circuit input and a first side of an AC motor; determining a stator winding configuration of the AC motor; configuring a control transformer in response to the AC voltage, frequency, the control transformer coupled to the circuit input; and configuring a jumper device on a second side of the AC motor in response to the stator winding configuration of the AC motor.

In Example 2, the subject matter of Example 1 can further include programming the soft starter circuit in response to AC motor parameters.

In Example 3, the subject matter of Examples 1-2 can further include wherein the AC motor parameters include: a current limit for the AC motor, an initial current for the AC motor, and a starter ramp time for the AC motor.

In Example 4, the subject flatter of Examples 1-3 can further include wherein determining the stator winding configuration of the AC motor comprises determining if the AC motor stator winding configuration is an inside delta winding or an in-line Wye winding.

In Example 5, the subject matter of Examples 1-4 can further include wherein configuring the jumper cable on the second side of the AC motor comprises installing the jumper cable between the second side of the AC motor and the circuit input.

In Example 6, the subject matter of Examples 1-5 can further include wherein configuring the jumper cable on the second side of the AC motor comprises installing the jumper cable across the second side of the AC motor such that connections of the second side of the AC motor are shorted together.

In Example 7, the subject matter of Examples 1-6 can further include wherein configuring the control transformer comprises installing one or more jumper cables on a first side of the control transformer such that a second side of the control transformer is configured to provide 120 VAC.

Example 8 is an apparatus comprising: a configurable input jumper device coupled to a three phase, alternating current (AC) voltage input node; a control transformer coupled to the input jumper device; a programmable soft starter circuit coupled between the input jumper device and a first AC motor node; and a configurable AC motor jumper device coupled to a second AC motor node; wherein the configurable input jumper device is configurable in response to a supply voltage on the three phase AC voltage input node and the configurable AC motor jumper device is configurable in response to a stator winding configuration of an AC motor coupleable between the first AC motor node and the second AC motor node.

In Example 9, the subject matter of Example 8 can further include wherein the configurable AC motor jumper device shorts together connections of the second AC motor node in response to the AC motor having a Wye configuration.

In Example 10, the subject matter of Examples 8-9 can further include wherein the configurable AC motor jumper device couples the second AC motor node to the configurable input jumper device in response to the AC motor having a delta configuration.

In Example 11, the subject matter of Examples 8-10 can further include wherein the configurable input jumper device comprises a jumper for each phase of the supply voltage.

In Example 12, the subject matter of Examples 8-11 can further include wherein the configurable input jumper device comprises a jumper configuration in response to the supply voltage such that a second winding of the control transformer is configured to be at 120 VAC.

Example 13 is a system comprising: a three phase alternating current (AC) motor having a stator winding configuration, a first winding side, and a second winding side; a three phase AC voltage input node; a configurable input jumper device coupled to the three phase AC voltage input node; a control transformer having a first side and a second side, the first side coupled to the input jumper device and the second side coupled to a control circuit; a programmable soft starter circuit coupled between the input jumper device and the first winding side of the AC motor; and a configurable AC motor jumper device coupled to the second winding side of the AC motor; wherein the configurable input jumper device is configured in response to a voltage level of a supply voltage on the three phase AC voltage input node and the configurable AC motor jumper device is configured in response to a stator winding of the AC motor.

In Example 14, the subject matter of Example 13 can further include wherein the stator winding of the AC motor comprises a Wye configuration.

In Example 15, the subject matter of Examples 13-14 can further include wherein the stator winding of the AC motor comprises a delta configuration.

In Example 16, the subject matter of Examples 13-15 can further include wherein the supply voltage is in a range of 380 VAC-690 VAC.

In Example 17, the subject matter of Examples 13-16 can further include wherein the supply voltage has a frequency of 50 Hertz (Hz) or 60 Hz.

In Example 18, the subject matter of Examples 13-17 can further include wherein the system is disposed on a drilling rig.

In Example 19, the subject matter of Examples 13-18 can further include wherein the system is disposed on a skid of a drilling rig.

In Example 20, the subject matter of Examples 13-19 can further include wherein the AC motor comprises a delta configuration in response to the supply voltage being less than or equal to 480 VAC and a Wye configuration in response to the supply voltage being greater than 480 VAC.

The detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The detailed description is, therefore, not to be taken in a limiting sense.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method comprising:
   making a first determination of an alternating current (AC) voltage and frequency of a supply voltage coupled to a circuit input, the circuit comprising a soft starter circuit coupled between the circuit input and a first side of an AC motor;
   making a second determination of a stator winding configuration of the AC motor based on the AC voltage and the frequency of the supply voltage, wherein the stator winding configuration is any one of an inside delta winding or an in-line Wye winding;
   after making the first determination, installing one or more transformer jumper cables on a first side of a control transformer such that a second side of the control transformer is configured to provide a transformer output voltage to a control circuit;
   after making the second determination, configuring a jumper cable on a second side of the AC motor by either:
   (a) installing the jumper cable between the second side of the AC motor and the circuit input if the stator winding configuration is the inside delta winding, or
   (b) installing the jumper cable across the second side of the AC motor such that connections of the second side of the AC motor are shorted together if the stator winding configuration is the in-line Wye winding; and
   operating the AC motor at the AC voltage and frequency of the supply voltage.

2. The method of claim 1, further comprising programming the soft starter circuit in response to AC motor parameters.

3. The method of claim 2, wherein the AC motor parameters include: a current limit for the AC motor, an initial current for the AC motor, and a starter ramp time for the AC motor.

4. The method of claim 1, wherein the supply voltage is in a range of 380 VAC to 690 VAC.

5. The method of claim 1, wherein the transformer output voltage is 120 VAC.

6. An apparatus comprising:
   an input jumper device coupled to a three phase, alternating current (AC) voltage input node comprising AC voltage and a frequency from a supply voltage:
   a control transformer coupled to the input jumper device;
   a programmable soft starter circuit coupled between the input jumper and a first AC motor node; and
   a configurable AC motor jumper device coupled to a second AC motor node;
   an AC motor comprising an inside delta winding stator winding configuration or an in-line Wye winding stator winding configuration;
   wherein the input jumper device is configurable to install a transformer jumper cables on a first side of the control transformer in response to the AC voltage and frequency of the supply voltage on the three phase AC voltage input node, and wherein the configurable AC motor jumper device is configurable to:
   install a jumper cable between a second AC motor node and the voltage input node if the AC motor comprises the inside delta winding stator winding configuration, or
   install the jumper cable across the second AC motor node such that connections on the second side of the AC motor are shorted together if the AC motor comprises in-line wye winding stator winding configuration.

7. The apparatus of claim 6, wherein the configurable AC motor jumper device shorts together connections of the second AC motor node in response to the AC motor having a Wye configuration.

8. The apparatus of claim 6, wherein the configurable AC motor jumper device couples the second AC motor node to the configurable input jumper device in response to the AC motor having a delta configuration.

9. The apparatus of claim 6, wherein the configurable input jumper device comprises a jumper for each phase of the supply voltage.

10. The apparatus of claim 9, wherein the configurable input jumper device comprises a jumper configuration in response to the supply voltage such that a winding of the control transformer is configured to be at a specified voltage to power the programmable soft starter circuit.

11. A system comprising:
   a three phase alternating current (AC) motor having a stator winding configuration, a first winding side, and a second winding side; a three phase AC voltage input node;
   an input jumper device coupled to the three phase AC voltage input node;

a control transformer having a first side and a second side, the first side coupled to the input jumper device and the second side coupled to a control circuit;

a programmable soft starter circuit coupled between the input jumper device and the first winding side of the AC motor; and a configurable AC motor jumper device coupled to the second winding side of the AC motor;

wherein the input jumper device is configured to install a transformer jumper cables on a first side of the control transformer in response to a voltage level of a supply voltage on the three phase AC voltage input node and the configurable AC motor jumper device is configured to:

install a jumper cable between a second side of the three phase AC motor and the three phase voltage input node if the stator configuration comprises an inside delta winding, or install the jumper cable across the second side of the three phase AC motor such that connections on the second side of the AC motor are shorted together if the stator configuration comprises in-line Wye winding in response to a stator winding of the AC motor.

12. The system of claim 11, wherein the supply voltage is in a range of 380 VAC-690 VAC.

13. The system of claim 12, wherein the supply voltage has a frequency of 50 Hertz (Hz) or 60 Hz.

14. The system of claim 11, wherein the system is disposed on a drilling rig.

15. The system of claim 14, wherein the system is disposed on a skid of a drilling rig.

* * * * *